Patented Jan. 3, 1933

1,892,693

UNITED STATES PATENT OFFICE

JOSEPH BLUMENFELD, OF PARIS, FRANCE, AND MAX MAYER, OF KARLSBAD, CZECHO-SLOVAKIA, ASSIGNORS, BY MESNE ASSIGNMENTS, TO KREBS PIGMENT AND COLOR CORPORATION, OF NEWARK, NEW JERSEY, A CORPORATION OF DELAWARE

PREPARATION OF TITANIUM PIGMENTS

No Drawing. Continuation of applications filed January 13, 1925, Serial Nos. 2,233 and 2,234, and in Germany August 11, 1924. Division of application filed May 15, 1930, Serial No. 452,810. This application filed May 15, 1930, Serial No. 452,811.

This invention relates to improvements in the preparation or manufacture of titanium pigments and the improved products resulting from such improved process.

Titanium pigments have been used extensively as substitutes for other pigments and have shown a general superiority over such pigments, especially when compared to other white pigments. They are, however, inclined to become powdery or to "chalk off" and this characteristic makes them objectionable for use where they will be exposed to the weather.

This application is a division of our application Serial Number 452,810 filed May 15, 1930 and a continuation of our copending applications Serial Numbers 2,233 and 2,234, filed January 13, 1925.

It is an object of the present invention to provide a process for preparing a titanium pigment of improved characteristics and one which may be safely used where it will be exposed to the weather. It is another object to provide a method for preparing a pigment having greater durability and one which will not be subject to the above defect. It is also an object of the invention to improve the quality of the pigment by controlling the conditions under which it is sintered. Another object of the invention is to produce a new pigment of improved characteristics. Other objects will become apparent.

The invention, broadly stated, comprises adding to precipitated titanic acid, substances which will improve the characteristics of the pigment resulting from the calcining operation. It also includes the addition of substances adapted to fill and remain in the interstices or pores of the titanium pigments as well as the addition of materials adapted to assist in the sintering action but which materials may be subsequently washed from the pigment.

In view of the pigmentary qualities required in the finished product, the materials added to fill the interstices or pores should have the essential characteristics of pigments or at least they should not detrimentally affect the pigmentary qualities of the product. It is also desirable that the material used for this purpose be one which may be applied to the titanium oxide by precipitation or coagulation from the solution in which the latter is suspended and one which will withstand the calcination to which the composite pigment is subjected. The filling or closing of the interstices or pores of the titanium oxide by the deposition of the finely divided particles resulting from the coagulation or precipitation, and the retention of these particles during the drying and calcining steps, result in a product having increased durability and decreased oil absorption.

The oxides and hydroxides of the tetravalent rare earths of the titanium-thorium family, which family also includes zirconium and cerium, have suitable characteristics for use in this connection and may be applied to the titanium oxide by precipitation or coagulation from solutions in which the titanium oxide is suspended.

We have also found that an improvement in the sintering of the above composite pigment or of the titanium oxide alone, may be accomplished by effecting the sintering in an acid atmosphere produced by free acids or by the heating of salts of an acid character. It is preferable to use for this purpose salts whose residues may be removed by washing the calcined product. Alkali salts are examples of substances suitable for this purpose.

In carrying out our improved process, the titanium oxide may be mixed with the rare earth compound, preferably the hydroxide or oxide in colloidal solution, and the rate earth oxide or hydroxide may be deposited upon and within the pores of, the particles of titanium oxide either by precipitation or coagulation. The composite precipitate resulting from the filling of the pores of the titanium oxide with the rare earth oxide or hydroxide may then be calcined at 800–1000° C. to give it the desired pigment properties.

Titanium oxide adaptable to be pore filled as described herein may be obtained conveniently from the main titanium product of the process described in United States Patent 1,504,672, but other tetravalent oxides of titanium obtained by precipitation and having any degree of hydration are also suitable and can be used in the present case. Further, these oxides or hydroxides may or may not be dried and/or calcined before they are put in suspension in the solution. In cases here the oxide has been calcined it is, of course, referable to bring it first to a fairly fine state of division.

In order to describe our invention more clearly, the following specific examples are given. It is not intended, however, to restrict the invention to the particular conditions and proportions recited, since it is apparent that these examples are only illustrative and many modifications may be made to obtain the desired improvement.

Example I

About 7 to 10 parts by weight of finely ground, preferably calcined, titanium oxide is suspended in 100 parts by weight of a solution of titanium or titanyl sulphate containing about 200 grams of titanium oxide per litre. This sulphate solution may be obtained by the customary procedure of treating ilmenite with sulphuric acid. The mixture is heated to hydrolytically precipitate titanium oxide from the sulphate solution upon the suspended titanium oxide. The heating may be done under atmospheric or increased pressure and a reflux cooler may be used if it is desired to prevent evaporation.

The pore-filled titanium oxide is separated from the solution, for instance, by filtering, and may be washed to free it from acid, and calcined at about 800–1000° C.

Example II

About 10 parts by weight of calcined titanium oxide are finely ground and mixed with 7 parts by weight of a colloidal thorium solution containing about 300 grams of thorium oxide per litre of solution. The water of the mixture is evaporated and calcination is effected at red heat. The calcined product may be cooled and ground in a wet or dry condition.

The calcining of the titanium dioxide before depositing the thorium oxide gives the particles a definite structure upon which the pore filling material may be deposited. It is apparent that a similar improvement may be accomplished by adding the finely ground calcined titanium oxide to a colloidal solution of titanium oxide and coagulating the colloidal titanium dioxide.

If preferred, the titanium or thorium oxide may be coagulated by heating and the water may be separated from the suspended material by decanting and/or filtering, after which the composite solids may be calcined and ground.

An improved result may also be obtained by using moist precipitated titanium dioxide, containing about 50% water, in place of the calcined material referred to in the above illustrations.

Example III

The pore-filled titanium oxide, referred to in the above examples, may be calcined in the presence of a salt. For example, a small quantity of colloidal titanium or thorium oxide may be mixed with titanium oxide and this mixture may be dispersed in sodium sulphate solution. The sodium sulphate will coagulate the colloidal titanium or thorium oxide and the water may then be evaporated or otherwise separated from the mixture of solids which may then be calcined by heating to about 800–1000° C. After the calcining the sodium sulphate remaining upon the pigment may be separated by washing the calcined mixture. If desired, other salts, such as potassium carbonate, may be substituted for the sodium sulphate.

Example IV

An improved product will also result from sintering the titanium oxide with a salt, without the addition of a pore-filling material. As an illustration, 10 parts by weight of titanium oxide in a moist or dry condition are intimately mixed with two parts by weight of potassium bisulphate and the mixture may be calcined at a temperature of 800° to 1000° C. The sulphuric and sulphurous acid given off during the heating may be collected and utilized. After heating, the potassium sulphate is extracted from the calcined materials by washing with water and any remaining acid may be removed by treating the moist or dry product with an oxide of a metal capable of reacting with the sulphate to form a residue having pigmentary qualities, for example, zinc oxide or magnesium oxide. A considerably smaller quantity of potassium bisulphate, for example as little as 2% of the weight of titanium oxide, may be used.

Example V

As another example of the heating of titanium oxide with an alkali salt, 10 parts by weight of moist titanium hydroxide, obtained from a neutral or basic titanium sulphate solution, are intimately mixed with about 0.5 parts by weight of potassium carbonate, and the mixture is heated for a suitable time, for example, two hours, at a temperature of about 800°–1000° C. The calcined material is washed first with water to remove the potassium sulphate and then with mineral acid until completely neutral and is then dried. A considerably smaller quantity of potassium carbonate may be used, for example, very satisfactory results are obtained by using potassium carbonate in the proportion of 0.5% of the titanium oxide.

If the oxide, referred to in the above examples, is obtained by precipitating titanium sulphate solution, it will contain sufficient sulphuric acid to convert the alkali carbonate to a sulphate. A similar result may be obtained by adding an alkali hydroxide.

The improvement in whiteness of the pigment resulting from the calcining in the presence of an alkali salt does not seem to be dependent upon the presence of the sulphate radical, since similar improvement may be accomplished by heating in the presence of other alkali salts. Improvements in results may be accomplished by adding the alkali salt in proportions up to about 2% of sodium salt, but the addition of a greater amount does not greatly improve the whiteness of the product. The quantity of water soluble salt present during the calcining may be regulated by controlling the concentration of the solution from which the solids are separated or by washing the separated solids so as to remove a portion only of the water soluble salt.

It is apparent that various modifications and combinations of the above illustration may be used and that the quantities may be varied and it is not intended to restrict the invention to the particular embodiment described. In the appended claims the term titanium-thorium family is used to include these elements, together with zirconium and cerium.

The sintered product produced according to the above processes, or modifications of these processes, may be ground wet or dry and mixed with the usual diluting agents and fillers, such as barium sulphate, zinc oxide and others, to produce a durable primary material for paints and other covering materials and one which may be applied where it is to be exposed to the weather.

We claim:

1. In the preparation of a titanium pigment, the steps comprising mixing moist titanium oxide with less than 2% of alkali carbonate in the presence of sulphate ions, calcining the mixture and washing the calcined materials to remove the water soluble residue.

2. In a process for producing a white titanium oxide pigment, the step of calcining at a temperature upward of about 800° C, a mixture comprising a precipitated titanium oxygen compound and an alkali metal compound.

3. In a process for producing a white titanium oxide pigment, the step of calcining at a temperature upward of about 800° C, a mixture comprising a precipitated titanium oxygen compound and a sodium compound.

4. In a process for producing a white titanium oxide pigment, the step of calcining at a temperature upward of about 800° C, a mixture comprising a precipitated titanium oxygen compound and a potassium compound.

5. In a process for preparing a titanium pigment, the steps of incorporating into a precipitated titanium oxygen compound a predetermined amount of an alkali-metal compound and calcining said mixture at a temperature upward of about 800° C.

6. In a process for producing a white titanium oxide pigment, the steps of incorporating into a precipitated titanium oxygen compound a predetermined amount of a potassium compound and calcining the mixture at a temperature upward of about 800° C.

7. In a process for producing a white titanium oxide pigment, the steps of incorporating into a precipitated titanium oxygen compound a predetermined amout of a sodium compound and calcining the mixture at a temperature upward of about 800° C.

8. In a process for producing a white titanium oxide pigment, the steps of incorporating into a precepitated titanium oxygen compound from about 0.5 to 20% of potassium compound and calcining the mixture at a temperature upward of about 800° C.

9. In a process for producing a white titanium oxide pigment, the step of incorporating into a precipitated titanium oxygen compound from about 0.5 to 5% of potassium carbonate and calcining the mixture at a temperature upward of about 800° C.

10. In a process for preparing a titanium pigment, the steps of incorporating into a precipitated titanium oxygen compound a predetermined amount of an alkali-metal compound and calcining said mixture at a temperature of about 800 to 1000° C.

11. In a process for producing a white titanium oxide pigment, the steps of incorporating into a precipitated titanium oxygen compound from about 0.5 to 20% of a potassium compound and calcining the mixture at a temperature of about 800 to 1000° C.

12. In a process for producing a white titanium oxide pigment, the step of incorporating into a precipitated titanium oxygen compound from about 0.5 to 5% of potassium carbonate and calcining the mixture at a temperature of about 800 to 1000° C.

13. In a process for preparing a white pigment, the steps comprising adding an alkali-metal compound to a titanium oxygen compound obtained by the hydrolysis of a titanium sulphate solution and containing the sulphate radical, and calcining the mixture at a temperature upward of about 800° C.

14. In a process for preparing a white pigment, the steps comprising adding an alkali-metal compound to a titanium oxygen compound obtained by the hydrolysis of a titanium sulphate solution and containing the sulphate radical, and calcining the mixture at a temperature of about 800° to 1000° C.

In testimony whereof, we have signed our names to this specification, at Paris, France, this 12 day of April, 1930.
          JOSEPH BLUMENFELD.

At Munich, Germany, this 28th day of April, 1930.
          MAX MAYER.